Oct. 21, 1947.  H. L. KNAPP  2,429,517

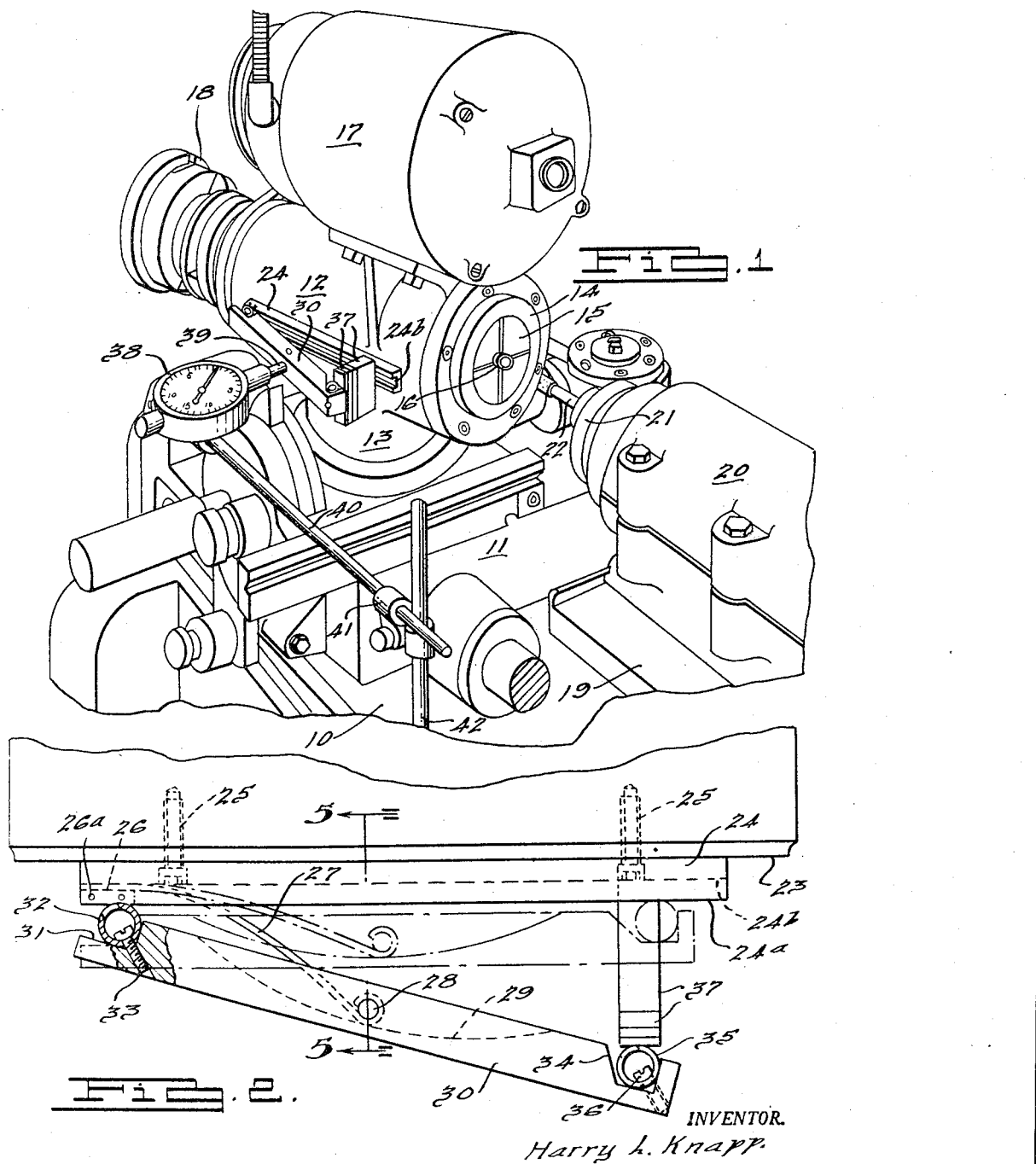

MACHINE FOR GRINDING WORKPIECES

Filed Feb. 17, 1945  2 Sheets—Sheet 2

INVENTOR.
Harry L. Knapp.
BY
Gray & Smith
ATTORNEYS.

Patented Oct. 21, 1947

2,429,517

UNITED STATES PATENT OFFICE 2,429,517

MACHINE FOR GRINDING WORKPIECES

Harry L. Knapp, Detroit, Mich.

Application February 17, 1945, Serial No. 578,495

14 Claims. (Cl. 51—50)

This invention relates to machines, especially metal working machines, for carrying out various types of machining operations such, for example, as grinding, cutting, milling, reaming, shaping and any other operations which it is desired to carry out with the work supporting head positioned at any predetermined angle with respect to the axis of the tool spindle. The invention is applicable in particular to that class of machines, especially metal working machines, in which the workhead is swiveled so as to permit angular adjustment thereof with respect to the tool.

An object of the invention is to provide improved means associated with the workhead or work support of the machine for enabling accurate and quick adjustment of the head angularly with respect to the longitudinal axis of the machine.

A further object of the invention is to provide a gage device attachable to or associated with the swiveled workhead of a machine, such as a metal working machine, by which adjustment of the workhead to any desired angle may be readily made and accurately determined.

Still another object of the invention is to provide a sine bar attachment for the swiveled work supporting head of a machine comprising a pair of angularly adjustable members which may be spread apart and set in predetermined angularly related positions by means of properly dimensioned gage blocks establishing the sine of the particular angle to which it is desired to adjust the workhead.

Other objects of this invention will appear in the following description and appended claims, reference being had to the accompanying drawings forming a part of this specification wherein like reference characters designate corresponding parts in the several views.

Fig. 1 is a fragmentary perspective view of a machine having a swiveled head upon which is mounted a sine bar attachment constructed in accordance with the present invention.

Fig. 2 is a plan view, partly in section, of the attachment.

Figure 3:
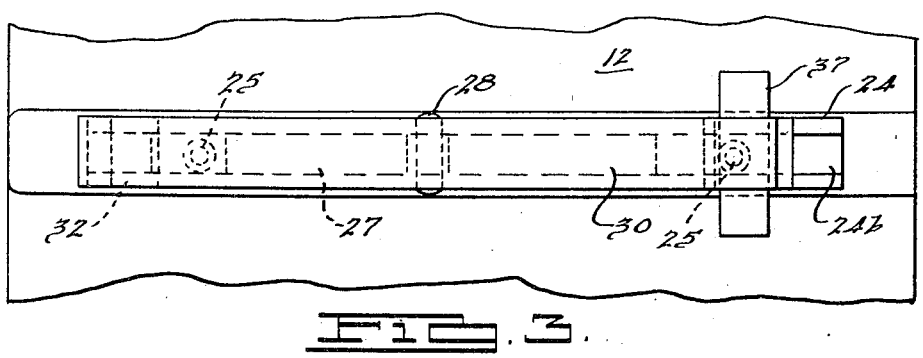
Fig. 3 is a side view thereof.
Figure 4:
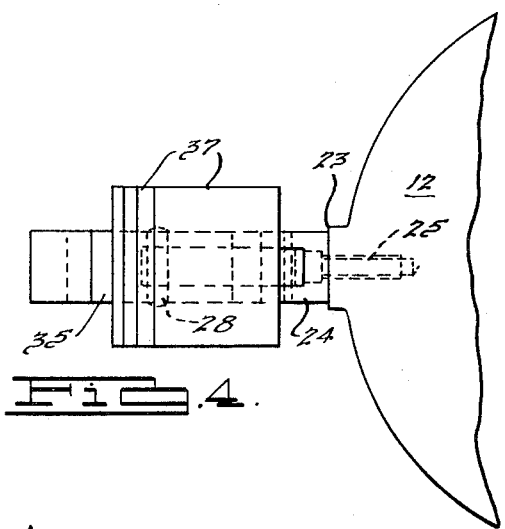
Fig. 4 is an end elevation looking toward the righthand end of the device shown in Fig. 2.
Figure 5:
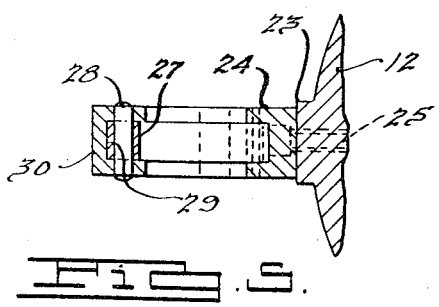
Fig. 5 is a section taken substantially through lines 5—5 of Fig. 2 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings I have illustrated the invention as applied, by way of example, to a metal working machine adapted to perform internal grinding operations on a tubular workpiece. This type of machine has been selected merely for illustration purposes as it will be apparent that the device embodying the invention may be utilized in connection with the swiveled head of any machine in which it is desired to adjust the head angularly relative to a predetermined axis such, for example, as the normal longitudinal axis of the work spindle or tool spindle.

The present machine, as illustrated in Fig. 1, comprises a suitable bed 10 upon which is mounted a work slide 11 supported and guided in such manner that it may be readily shifted toward and from the tool spindle into and out of operative position with respect thereto. Supported on the work slide 11 is a work spindle head 12 which has a swiveled connection at 13 with the slide so that the head 12 may be adjusted angularly in a horizontal direction. The head 12 carries a rotary work spindle 14 which is mounted in suitable bearings therein. The forward end of the work spindle is constructed in any suitable or conventional fashion to receive a collet 15 which in turn receives the tubular workpiece 16. The collet is of conventional kind provided with an external tapered portion cooperating with an internal tapered portion on the end of the spindle so that by shifting the collet longitudinally with respect to the spindle the collet may be contracted or expanded to grip or release the workpiece 16. Bolted to the top of the workhead 12 is an electric motor 17 which drives the work spindle 14 through the medium of a belt or pulley drive indicated generally at 18. For the purpose of performing internal grinding operations on the workpiece 16 the work support or slide 11 is pivotally mounted so that by suitable adjustment thereof the workpiece may be shifted laterally with respect to the tool 22 during the grinding operation.

Mounted on the bed 10 is a tool slide 19 upon which is supported a tool spindle head 20 adjustable transversely in suitable ways carried by the slide 19. Mounted in bearings in the head 20 is a rotary tool spindle 21 provided at its forward end with the usual collet for supporting the shank of a tool 22, such as a grinding tool illustrated in the present case by way of example. Suitable mechanism, not shown, is provided for reciprocating the tool slide 19 toward and from the workhead so as to cause the tool to perform the desired machining operations on the workpiece.

The present machine has been illustrated in the drawings and described only to the extent believed necessary for an understanding of the invention. For further details of the particular machine herein selected for the purpose of exemplifying the invention, reference may be had to my copending application Serial No. 537,832, filed May 29, 1944.

The swivel mounting 13 for the work spindle head 12 permits the head to be adjusted angularly and horizontally to any desired angle in order to permit the tool to grind taper and angular holes. In order to turn the head about its fixed vertical axis formed by the swivel mounting 13 so that it may be positioned at the exact predetermined angle desired for the purpose of causing the tool to machine the workpiece accurately at this predetermined angle, I have provided what is herein termed a "sine bar" attachment for the workhead 12 by which the correct angular adjustment of the workhead may be quickly made and established with a high degree of accuracy.

The work spindle head 12 is formed with a longitudinally extending boss 23 having the outer face thereof machined accurately so as to lie in a true plane parallel to the axis of the work spindle 14. Mounted on the face of this boss 23 is a channel bar 24 having its outer faces 24a at opposite sides of the central longitudinal channel 24b thereof machined accurately so as also to lie in a true plane parallel to the face 23 and also the axis of the work spindle. The channel bar 24 is removably secured to the workhead by means of screws 25 threaded into tapped holes in the workhead and having the heads of the screws confined within the channel 24b of the bar. Mounted within the channel 24b at the rear end of the channel bar 24 is a hardened steel retainer piece 26 which fits snugly within the channel and is held therein by means of dowel pins 26a. The retainer piece provides a means for retaining and anchoring the rear end of a leaf spring 27 extending within the channel 24b. The outer end of the spring 27 is provided with a coil 27a embracing a vertical pin 28 lying within a groove 29 formed in a bar 30. The outer end of the spring thus extends within the groove 29 in this bar and supports the bar through the medium of the pin 28 attached to the bar. The rear end of the bar 30 is provided with a notch 31 adapted to receive a hardened cylindrical bushing 32 which is rigidly secured in position within the angle of the notch 31 by means of a screw 33. The forward end of the bar 30 is also provided with a notch 34 within which lies a cylindrical hardened bushing 35 which is rigidly secured within the notch 34 by means of a screw 36.

The bushing 32 is positioned so as to bear against the outer face of the spring retainer piece 26, this piece being hardened and having its outer face lying flush with the outer face of the bar 24. The spring 27 is normally under tension so as to urge the bar 30 at all times toward the dotted line position shown in Fig. 2 in which the parallel inner and outer faces of the bar lie parallel to the outer face of the bar 24 with the bushings 32 and 35 in engagement therewith. The bar 30 may be swung outwardly to any desired angle and during this adjustment the bushing 32 will be pivoted on the face of the hardened retainer plate 26. Such angular adjustment of the bar 30 will be opposed by the spring 27 which at all times tends to urge the bar into parallel relation to the bar 24. Although the spring 27 is shown as having a single leaf, it will be understood that a multiple leaf spring may be used if desired.

The sine of any predetermined angle to which the workhead 12 is to be adjusted relatively to the longitudinal axis of the tool spindle is established by means of gage blocks 37 which are accurately formed and dimensioned. The bar 30 is swung outwardly against the action of the spring 27 and the required number of gage blocks 37 are interposed between the bushing 35 and the outer face 24a of the channel bar 24 so as to establish the sine of the angle to which the head 12 is to be set. Since the action of the spring 27 will result in clamping the gage blocks 37 between the bushing 35 and the bar 24, the blocks 37 will remain in the position shown in Figs. 1 and 2 without dislodgement while the setting of the head is being made. With the gage blocks 37 in position so as to establish the correct angle between the bars 24 and 30, the head 12 is turned on its swivel mounting, thus positioning the bar 24 angularly with respect to the axis of the tool spindle. The correct angle setting will be established when the bar 30 assumes a position exactly parallel to the tool spindle axis. This is determined by means of an indicator gage 38 having a spring pressed plunger 39 positioned for engagement by the bar 30. The gage 38 may be of conventional type adjustably mounted upon a horizontal supporting bar 40 adjustably clamped at 41 to a vertical supporting bar 42 secured in fixed position to the bed of the machine. The plunger 39 of the gage is so positioned that the pointer on the gage will register zero when the bar 30 in contact with the end of the plunger assumes a position exactly parallel with the axis of the tool spindle or the normal longitudinal axis of the work spindle. If the bar 30 is moved outwardly beyond a position parallel to the tool spindle axis, it will force the plunger 39 inwardly and produce a reading other than zero on the dial of the gage. Thus, with the required number of gage blocks 37 interposed between the bars 24 and 30 as shown in Figs. 1 and 2, the correct angular position of the work spindle 12 will be reached when the bar 30 assumes a position parallel to the longitudinal axis of the tool spindle as determined when the plunger 39 in contact with the bar 30 is extended fully under the action of its spring so as to give a zero reading on the indicator gage 38.

I claim:

1. In a machine having a head swiveled to permit adjustment thereof into various angular positions with respect to the normal longitudinal axis of the head, a bar attachable to the head and having its outer face extending parallel to said axis, a second bar having a pivotal bearing at one end on said first bar, spring means connecting said first bar to the second bar intermediate the ends of the latter and permitting the second bar to be swung outwardly relative to the first bar to a certain angular position as determined by a gage block or blocks positioned between the bars and establishing the angular relation of the bars.

2. In a machine having a head swiveled to permit adjustment thereof into various angular positions with respect to the normal longitudinal axis of the head, a bar attachable to the head and having its outer face extending parallel to said axis, a second bar having a pivotal bearing at one end on said first bar, spring means connecting said first bar to the second bar at an intermediate point on the latter and urging the second bar into parallel relation to the first bar, the opposite end of said second bar adapted to be swung outwardly relative to the first bar against the action of said spring means to a desired angular position as established by a gage block or blocks positioned between the separated ends of the bars.

3. In a machine having a head swiveled to permit adjustment thereof into various angular positions with respect to the normal longitudinal axis of the head, a bar attachable to the head and having its outer face extending parallel to said axis, a second bar having a pivotal bearing at one end on said first bar, spring means connecting said bars and permitting the opposite end of said second bar to be swung outwardly relative to the first bar to a certain angular position as determined by a gage block or blocks positioned between the bars and establishing the angular relation of the bars, and gage means supported independently of said second bar and engageable with said second bar to record the angular position of the second bar when the head is adjusted angularly.

4. In a machine having a head swiveled to permit adjustment thereof into various angular positions with respect to the normal longitudinal axis of the head, a bar attachable to the head and having its outer face extending parallel to said axis, a second bar having a pivotal bearing at one end on said first bar, spring means connecting said bars and urging the second bar into parallel relation to the first bar, the opposite end of said second bar adapted to be swung outwardly relative to the first bar against the action of said spring means to a desired angular position as established by a gage block or blocks positioned between the separated ends of the bars, and gage means supported independently of said second bar and engageable with said second bar to record the angular position of the second bar when the head is adjusted angularly.

5. A sine bar attachment for the swiveled head of a machine, comprising a pair of bars, one having a pivotal bearing on the other at corresponding ends, spring means urging said bars into generally parallel relation, the opposite corresponding ends of the bars adapted to be spread apart and to receive therebetween a gage element or elements for establishing a predetermined angular relation of the bars, one of said bars being attachable in fixed position to the head parallel to the axis thereof and said spring means being engageable with the other bar at an intermediate point thereon.

6. A sine bar attachment for the swiveled head of a machine, comprising a pair of bars, one having a pivotal bearing on the other at corresponding ends, spring means connecting one bar to the other bar at an intermediate point on the latter and urging said bars into generally parallel relation, the opposite corresponding ends of the bars adapted to be spread apart and to receive therebetween a gage element or elements for establishing a predetermined angular relation of the bars, one of said bars being attach- able in fixed position to the head parallel to the axis thereof.

7. A sine bar attachment for the swiveled head of a machine, comprising a pair of bars one adapted to be secured to the head in parallel relation to the axis thereof and the second having a pivotal bearing on said first bar adjacent corresponding ends of the bars, spring means interposed between said bars and extending into grooved portions thereof and urging said bars toward substantially parallel relation, said second bar adapted to be swung outwardly to spread the bars apart for the insertion between their spread ends of gage means establishing a predetermined angular relation of the bars.

8. A sine bar attachment for the swiveled head of a machine, comprising a pair of bars one adapted to be secured to the head in parallel relation to the axis thereof and the second having a pivotal bearing on said first bar adjacent corresponding ends of the bars, spring means interposed between said bars and extending into grooved portions thereof and urging said bars toward substantially parallel relation, said second bar adapted to be swung outwardly to spread the bars apart, and gage means insertable between the spread ends of the bars for maintaining the same in predetermined fixed angular relation.

9. In a machine having a head swiveled to permit adjustment thereof into various angular positions with respect to the normal longitudinal axis of the head, a bar attachable to the head and having its outer face extending parallel to said axis, a second bar having a pivotal bearing at an end on said first bar, spring means connecting said bars and permitting either end of said second bar to be swung outwardly relative to the first bar to a certain angular position, and gage means insertable between the spread ends of the bars for maintaining the same in predetermined fixed angular relation.

10. A sine bar attachment for the swiveled head of a machine, comprising a channel bar attachable to the head so as to have its outer face parallel to the axis of the head, a second bar having a bearing element at one end, spring means connecting the bars and holding said bearing element in engagement with the first bar while permitting the opposite end of the second bar to be swung outwardly to a predetermined angular position with respect to the first bar, said spring means having a portion anchored in the channel of the first named bar.

11. A sine bar attachment for the swiveled head of a machine, comprising a channel bar attachable to the head so as to have its outer face parallel to the axis of the head, a second bar having a bearing element at one end, spring means connecting the bars and holding said bearing element in engagement with the first bar while permitting the opposite end of the second bar to be swung outwardly to a predetermined angular position with respect to the first bar, said spring means having a portion anchored in the channel of the first named bar and another portion anchored in a groove or channel in the second bar.

12. A sine bar attachment for the swiveled head of a machine, comprising a channel bar attachable to the head so as to have its outer face parallel to the axis of the head, a second bar having a bearing element at one end, spring means connecting the bars and holding said bearing element in engagement with the first bar while permitting the opposite end of the second bar to be swung outwardly to a predetermined angular position with respect to the first bar, said spring means having a portion anchored in the channel of the first named bar, and gage means insertable between the spaced ends of the bars for holding said ends in said angular position.

13. A sine bar attachment, comprising a bar attachable to a swiveled head of a machine, a second bar having a pivotal bearing at an end on said first bar, and spring means interposed between said bars and permitting either end of the second bar to be swung outwardly relative to the first bar to a certain angular position.

14. A sine bar attachment, comprising a bar attachable to a swiveled head of a machine, a second bar having a pivotal bearing at an end on said first bar, and spring means interposed between said bars intermediate the ends of the second bar and permitting either end of the second bar to be swung outwardly relative to the first bar to a certain angular position.

HARRY L. KNAPP.

REFERENCES CITED

The following references are of record in the file of this patent:

UNITED STATES PATENTS

| Number | Name | Date |
| --- | --- | --- |
| 1,551,995 | Lovenston | Sept. 1, 1925 |
| 1,931,730 | Klay | Oct. 24, 1933 |
| 2,351,773 | Lovenston | June 20, 1944 |
| 1,476,573 | Allen | Dec. 4, 1923 |